(12) United States Patent
Zhu et al.

(10) Patent No.: US 9,731,978 B2
(45) Date of Patent: Aug. 15, 2017

(54) METHOD FOR PREPARING BASIC ZINC CHLORIDE

(71) Applicant: DONGJIANG ENVIRONMENTAL CO., LTD., Shenzhen (CN)

(72) Inventors: Junqiang Zhu, Shenzhen (CN); Wenbin Xu, Shenzhen (CN); Yanjie Wang, Shenzhen (CN); Long Chen, Shenzhen (CN); Cheng Yuan, Shenzhen (CN); Zhijia Zeng, Shenzhen (CN); Bing Fan, Shenzhen (CN)

(73) Assignee: DONGJIANG ENVIRONMENTAL CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/028,318

(22) PCT Filed: Jul. 15, 2015

(86) PCT No.: PCT/CN2015/084103
§ 371 (c)(1),
(2) Date: Apr. 8, 2016

(87) PCT Pub. No.: WO2016/065950
PCT Pub. Date: May 6, 2016

(65) Prior Publication Data
US 2016/0326006 A1    Nov. 10, 2016

(30) Foreign Application Priority Data

Oct. 28, 2014    (CN) .......................... 2014 1 0585190

(51) Int. Cl.
*C01G 9/04*    (2006.01)
*C01G 9/00*    (2006.01)

(52) U.S. Cl.
CPC ................ *C01G 9/04* (2013.01); *C01G 9/00* (2013.01); *C01P 2002/72* (2013.01); *C01P 2004/03* (2013.01); *C01P 2004/51* (2013.01); *C01P 2004/52* (2013.01); *C01P 2004/53* (2013.01); *C01P 2004/61* (2013.01); *C01P 2006/12* (2013.01)

(58) Field of Classification Search
CPC ..................................................... C01G 9/04

USPC ................................ 423/462, 463, 472, 491
See application file for complete search history.

(56) References Cited

U.S. PATENT DOCUMENTS

| | | | | | |
|---|---|---|---|---|---|
| 4,865,831 | A | * | 9/1989 | Murphy | ................. C01C 1/006 423/101 |
| 2010/0266480 | A1 | * | 10/2010 | Huang | ..................... C01G 9/00 423/491 |
| 2015/0225253 | A1 | * | 8/2015 | Chen | ........................ C01G 9/04 423/462 |

FOREIGN PATENT DOCUMENTS

| | | |
|---|---|---|
| CN | 1328171 | 7/2007 |
| CN | 100366539 | 2/2008 |
| CN | 100496278 | 6/2009 |
| CN | 100564263 | 12/2009 |
| CN | 101712485 B | 6/2012 |
| CN | 102502783 | 6/2012 |
| CN | 103043708 | 4/2013 |
| CN | 101712485 | 5/2013 |
| CN | 103121706 | 5/2013 |
| CN | 102745737 | 4/2014 |
| CN | 104276595 | 1/2015 |

\* cited by examiner

*Primary Examiner* — Ngoc-Yen Nguyen
(74) *Attorney, Agent, or Firm* — Hamre, Schumann, Mueller & Larson, P.C.

(57) ABSTRACT

The present invention relates to a method for preparing basic zinc chloride, comprising the following steps: A: preparing raw materials: preparing zinc chloride solution, ammonia water and an induction system; B: performing synthesis: adding the zinc chloride solution and the ammonia water into the induction system in a parallel flow manner, and controlling the temperature to be 60.0-90.0° C.; after the feeding is finished, continuing to react for 20.0-40.0 minutes; and C: performing filtration, washing and drying: after filtering and washing the synthesized basic zinc chloride, drying the basic zinc chloride for 4.0-8.0 hours at 80-105° C. to obtain the basic zinc chloride product. Compared with the prior art, the method for preparing basic zinc chloride has such advantages as simple process, low impurity content, easy-to-control product quality, and suitability for industrialization.

7 Claims, 3 Drawing Sheets

METHOD FOR PREPARING BASIC ZINC CHLORIDE

TECHNICAL FIELD

The present invention relates to a chemical raw material preparation process, and in particular, to a method for preparing basic zinc chloride.

BACKGROUND

Basic zinc chloride, with a molecular formula of $ZnCl_2.4Zn(OH)_2.H_2O$ (or $Zn_5(OH)_8Cl_2.H_2O$), has good biological effects and adaptability. When being mixed with food, basic zinc chloride does not react with other ingredients, and basic zinc chloride is an excellent micronutrient additive and is mostly likely to replace other inorganic zinc such as zinc sulfate and zinc oxide. Moreover, basic zinc chloride has similar biological properties to the organic zinc, but its market price is lower; therefore, and the market prospect of basic zinc chloride is extensive.

In the international market, particularly in the European market, in addition to strict control over chemical indexes of basic zinc chloride, such as Pb, Cd, As, Hg and fluorine, there are also very strict requirements on the physical index—particle size—of basic zinc chloride. When the particle size is too large, the mixing dispersibility of the basic zinc chloride with other ingredients is poor; and when the particle size is small, dust is raised easily, thus producing an adverse effect on the environment and the human body.

There are many basic zinc chloride synthesis methods. However, these methods are roughly classified into two categories: (1) a zinc oxide method and (2) a hydrochloric acid or zinc chloride method. According to the zinc oxide method, basic zinc chloride is prepared by adopting alkali or alkali compounds and zinc oxide as raw materials, e.g., strong alkali or ammonia water is used in an embodiment of the patent CN101712485B METHOD FOR PREPARING BASIC ZINC CHLORIDE; and in the patent CN100496278C METHOD FOR PREPARING BASIC ZINC CHLORIDE FEED ADDITIVE and the patent CN1328171C METHOD FOR PREPARING MICROELEMENT ADDITIVE BASIC ZINC CHLORIDE, crushed Zn and $ZnCl_2$ are used as zinc sources respectively to be synthesized with zinc oxide to form basic zinc chloride. According to the hydrochloric acid or zinc chloride method, basic zinc chloride is formed by causing zinc-containing alkali compounds to react with hydrochloric acid or zinc chloride under appropriate conditions, concrete zinc compounds are $ZnO$, $Zn(OH)_2$ and basic zinc carbonate and the like, and this method is adopted in, e.g., patents CN100564263 and CN100366539C.

As can be seen from the implementation process, the liquid-solid phase heterogeneous reaction generally occurs in the foregoing patents, the operation process is complex, generated basic zinc chloride is easily adsorbed to the surfaces of raw materials to form coating or sandwiching, and chemical ingredients of the product are determined by the raw materials completely, so that the quality is difficult to guarantee. Moreover, basic zinc chloride prepared in the foregoing process is large in specific surface area, so that the basic zinc chloride is high in water content and poor in filtering and washing performance and needs to undergo centrifugal dewatering, equipment and operations are complex, the fixed investment is high, the drying energy consumption is also high, and the industrialization cost is high.

A homogeneous phase synthetic route of using zinc chloride solution and ammonia water is put forward in the patent CN1027457378 METHOD FOR SYNTHESIZING BASIC ZINC CHLORIDE SINGLE-CRYSTALLINE NANOROD, and the chemical indexes of a product can be guaranteed by adopting appropriate control means. However, the content of zinc chloride used in the invention is low (0.08-0.16 mol/L), synthesized basic zinc chloride particles are small (the diameters are 70.0 nm and the lengths are about 400 nm); absolute ethyl alcohol is used for dewatering and drying, the investment of synthesis, separation and drying equipment needed for mass production is high, the running cost is high, the product has difficulty in meeting the market demand, and thus the industrialization prospect is not ideal.

SUMMARY

Against the to-be-solved technical problem, the present invention provides a method for preparing basic zinc chloride, which is simple in process and low in impurity content, is easy to control product quality and is suitable for industrialization, so as to overcome the shortcomings in the prior art.

The present invention can solve the technical problem by adopting the following technical solution:

A method for preparing basic zinc chloride is provided and comprises the following steps:

A: preparing raw materials: preparing zinc chloride solution, ammonia water and an induction system, wherein the zinc content of the zinc chloride solution is 50.0-150.0 g/L; the ammonia water is prepared from industrial grade ammonia water, and the concentration of $NH_3$ is 45.0-95.0 g/L; the induction system is hydrochloric acid solution where an inducer is dissolved, and the pH is 0-5.0; the additive amount of the inducer is 0.05%-1.0% the total mass of a reaction system, and the molar ratio of the zinc chloride solution to the ammonia water is 0.5:1-0.65:1;

B: performing synthesis: adding the zinc chloride solution and the ammonia water into the induction system in a parallel flow manner, and controlling the temperature to be 60.0-90.0° C.; after the feeding is finished, continuing to react for 20.0-40.0 minutes; and C: performing filtration, washing and drying: after filtering and washing the synthesized basic zinc chloride, drying the basic zinc chloride for 4.0-8.0 hours at 80-105° C. to obtain the basic zinc chloride product.

The zinc chloride solution is formed by dissolving and purifying industrial grade zinc chloride, or is formed by causing industrial grade zinc-containing waste materials to undergo leaching and impurity removal.

The pH of the induction system is 0-3.0.

The inducer is a chlorinated or brominated quaternary ammonium salt, wherein the quaternary ammonium salt comprises tetrabutylammonium chloride, tetrabutylammonium bromide, cetyl trimethyl ammonium chloride, cetyl trimethyl ammonium bromide, octadecyl trimethyl ammonium chloride or octadecyl trimethyl ammonium bromide.

The additive amount of the induction system is 0.1%-5.0% of the total mass of the reaction system.

The induction system may also be formed by directly dissolving the inducer in the ammonia water.

Compared with the prior art, the method for preparing basic zinc chloride has the following beneficial effects: (1) Basic zinc chloride is stable in quality; it can be guaranteed that the impurity content of zinc chloride solution does not exceed the standard, and the contents of key indexes such as Pb, Cd, Hg, F and As in the product meet the domestic and European and American standard requirements easily; (2) The water content is low, and the specific surface area is large; after the synthesized basic zinc chloride undergoes washing and suction filtration, the water content is 45.0-50.0%, and if the synthesized basic zinc chloride undergoes filter pressing or centrifugation, the water content is lower; after a crude product is dried, the specific surface area of the basic zinc chloride product is below 0.6 $m^2/g$, and even smaller than 0.3 $m^2/g$; (3) The synthetic process is simple and easy to control, the particle size distribution of the prepared basic zinc chloride is uniform, and a series of products with the volume average particle size of 20.0-110.0 μm can be prepared by changing operation conditions appropriately.

DESCRIPTION OF EMBODIMENTS

Further detailed description is performed below in combination with optimal embodiments as shown in accompanying drawings.

A method for preparing basic zinc chloride according to the present invention comprises the following steps:

A: preparing raw materials: preparing zinc chloride solution, ammonia water and an induction system, wherein the zinc content of the zinc chloride solution is 50.0-150.0 g/L; the ammonia water is prepared from industrial grade ammonia water, and the concentration of $NH_3$ is 45.0-95.0 g/L; the induction system is hydrochloric acid solution where an inducer is dissolved, and the pH is 0-5.0 and is most preferably 0-3.0; the inducer is a chlorinated or brominated quaternary ammonium salt, and the quaternary ammonium salt comprises tetrabutylammonium chloride, tetrabutylammonium bromide, cetyl trimethyl ammonium chloride, cetyl trimethyl ammonium bromide, octadecyl trimethyl ammonium chloride or octadecyl trimethyl ammonium bromide; the additive amount of the inducer is 0.005%-1.0% and is most preferably 0.01%-0.5%; the molar ratio of the zinc chloride solution to the ammonia water is 0.5:1-0.65:1; and the zinc chloride solution is formed by dissolving and purifying industrial grade zinc chloride, or is formed by causing industrial grade zinc-containing waste materials to undergo leaching and impurity removal (the contents of impurities such as Fe, Mn, Pb, Cd, Hg and As are all lower than 5.0 mg/L);

B: performing synthesis: adding the zinc chloride solution and the ammonia water into the induction system in a parallel flow manner, and controlling the temperature to be 60.0-90.0° C.; after the feeding is finished, continuing to react for 20.0-40.0 minutes; and C: performing filtration, washing and drying: after filtering and washing the synthesized basic zinc chloride, drying the basic zinc chloride for 4.0-8.0 hours at 80-105° C. to obtain the basic zinc chloride product.

After the step C, as required, the basic zinc chloride product undergoes chemical composition, X diffraction, scanning electron microscope and laser particle size analysis, etc.

In the implementing process, the inducer may be directly dissolved in the ammonia water.

Embodiment 1

Prepare hydrochloric acid with a concentration of 1.0 mol/L, zinc chloride solution with a concentration of 97.6 g/L and ammonia water with an $NH_3$ content of 68.0 g/L, and dissolve 0.1 g of octadecyl trimethyl ammonium bromide in the ammonia water; first transfer 100.0 ml of the hydrochloric acid into a 2000.0 ml reactor, stir and heat the hydrochloric acid, control the temperature to be about 58.0° C.; add 270.0 ml of ammonia water and 416.2 ml of zinc chloride into the reactor in a parallel flow manner; after the feeding is finished, continue to react for half an hour, perform filtration and washing, and finally dry the basic zinc chloride for 6.0 hours at 90.0° C. to obtain the basic zinc chloride product.

Figure 1:
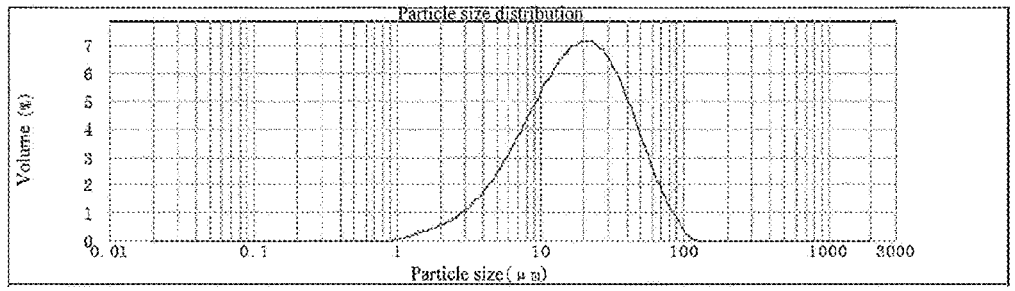
FIG. 1 is a particle size distribution diagram of a basic zinc chloride product prepared according to Embodiment 1.

Perform ingredient and particle size analysis on the finished product, the result indicates that the percentage of Zn is 58.8%, the percentage of Cl is 12.0%, the Pb concentration is 3.5 ppm, the Cd concentration is 4.0 ppm and the As concentration is 3.17 ppm; the chemical indexes meet the national standard requirements for feed grade basic zinc chloride; the specific surface area is 0.523 $m^2/g$, the volume average particle size is 22.063 μm, d(0.1) 5.422 μm, d(0.5) 18.037 μm and d(0.9) 47.961 μm, and the specific particle size distribution is as shown in FIG. 1.

Embodiment 2

Prepare hydrochloric acid with a concentration of 0.25 mol/L, zinc chloride solution with a concentration of 110.0 g/L and ammonia water with an $NH_3$ content of 85.0 g/L, and dissolve 0.35 g of cetyl trimethyl ammonium chloride in the hydrochloric acid; first transfer 200.0 ml of the hydrochloric acid into a 2000.0 ml reactor, stir and heat the hydrochloric acid, control the temperature to be about 70.0° C.; add 250.0 ml of ammonia water and 450.0 ml of zinc chloride into the reactor in a parallel flow manner; after the feeding is finished, continue to react for half an hour, perform filtration and washing, and finally dry the basic zinc chloride for 10.0 hours at 85.0° C. to obtain the basic zinc chloride product.

Figure 2:
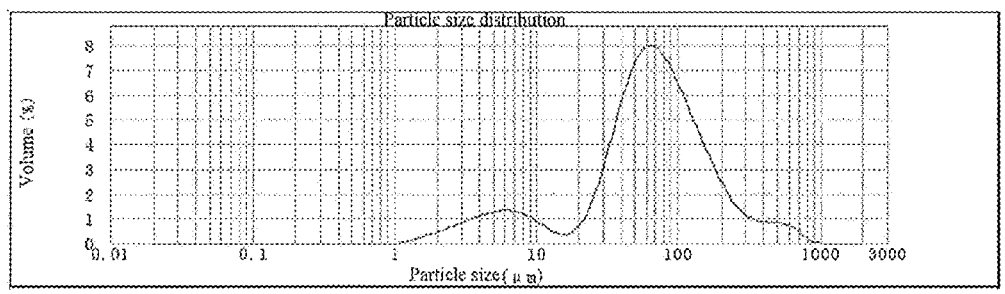
FIG. 2 is a particle size distribution diagram of a basic zinc chloride product prepared according to Embodiment 2.

Perform ingredient and particle size analysis on the finished product, the result indicates that the percentage of Zn is 59.5%, the percentage of Cl is 12.6%, the Pb concentration is lower than 3.5 ppm, the Cd concentration is lower than 4.0 ppm and the As concentration is 7.78 ppm; the chemical indexes meet the national standard requirements for feed grade basic zinc chloride; the specific surface area is 0.257 $m^2/g$, the volume average particle size is 96.913 μm, d(0.1) 8.209 μm, d(0.5) 66.367 μm and d(0.9) 195.707 μm, and the specific particle size distribution is as shown in FIG. 2.

Embodiment 3

Prepare hydrochloric acid with a concentration of 0.05 mol/L, zinc chloride solution with a concentration of 135.0 g/L and ammonia water with an $NH_3$ content of 72.0 g/L, and dissolve 0.5 g of cetyl trimethyl ammonium bromide in the hydrochloric acid; first transfer 600.0 ml of the hydrochloric acid into a 2000.0 ml reactor, stir and heat the hydrochloric acid, control the temperature to be about 82.0°

C.; add 310.0 ml of ammonia water and 360.0 ml of zinc chloride into the reactor in a parallel flow manner; after the feeding is finished, continue to react for half an hour, perform filtration and washing, and finally dry the basic zinc chloride for 3.5 hours at 105.0° C. to obtain the basic zinc chloride product.

Figure 3:
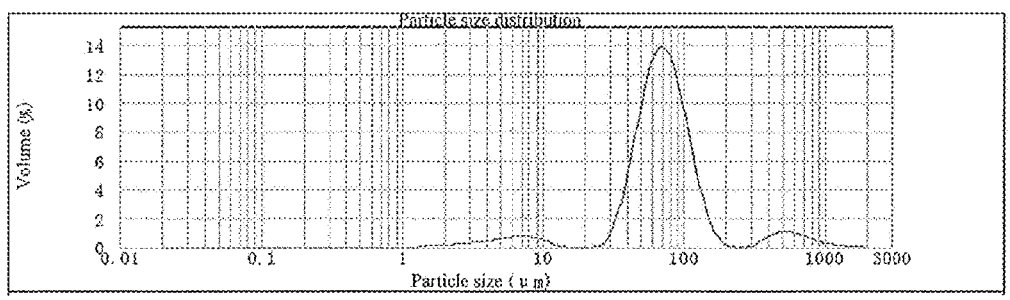
FIG. 3 is a particle size distribution diagram of a basic zinc chloride product prepared according to Embodiment 3.
Figure 4:
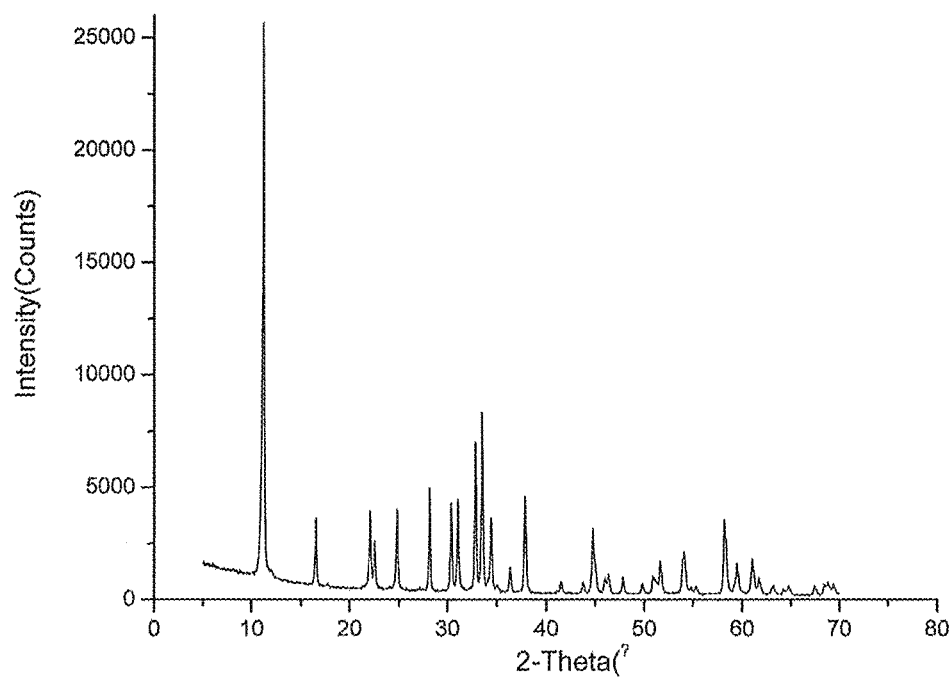
FIG. 4 is an X-ray diffraction (XRD) analysis diagram of the basic zinc chloride product prepared according to Embodiment 3.
Figure 5:
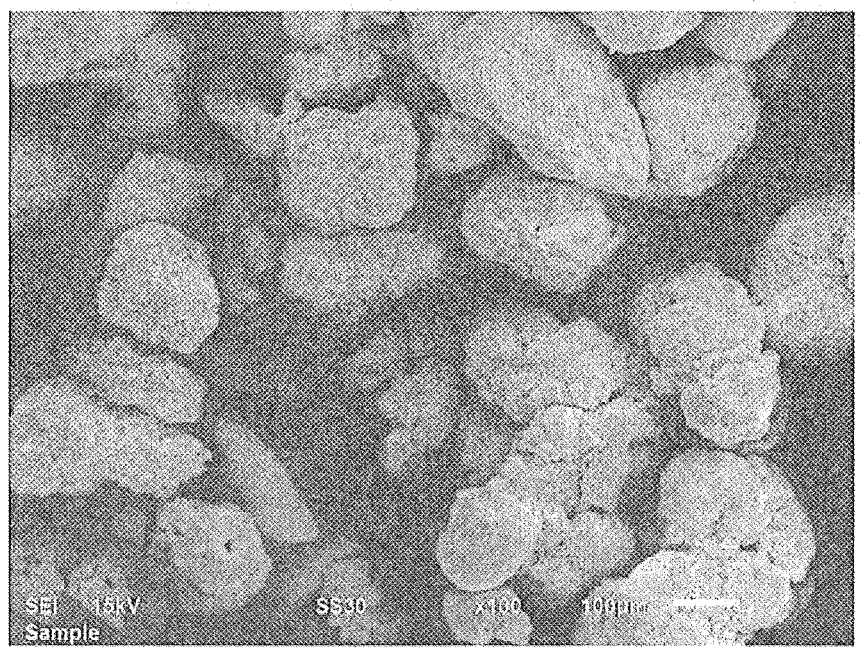
FIG. 5 is a scanning electron microscope (SEM) diagram (100 fold) of the basic zinc chloride product prepared according to Embodiment 3.
Figure 6:
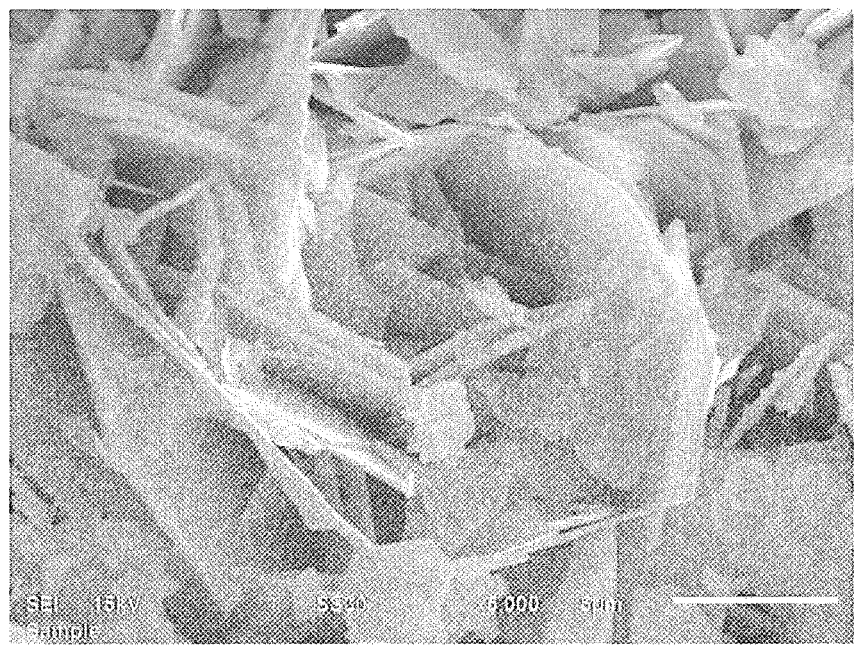
FIG. 6 is an SEM diagram (5000 fold) of the basic zinc chloride product prepared according to Embodiment 3.

Perform ingredient, particle size and microstructure analysis on the finished product, the result indicates that the percentage of Zn is 58.6%, the percentage of Cl is 12.1%, the Pb concentration is lower than 3.5 ppm, the Cd concentration is lower than 4.0 ppm and the As concentration is 1.13 ppm; the chemical indexes meet the national standard requirements for feed grade basic zinc chloride; the specific surface area is 0.154 m²/g, the volume average particle size is 103.873 μm, d(0.1) 38.92 μm, d(0.5) 70.987 μm and d(0.9) 131.553 μm, and the specific particle size distribution is as shown in FIG. 3. FIG. 4 is the XRD analysis diagram of the product; and FIG. 5 and FIG. 6 are SEM diagrams of the product prepared according to Embodiment 3 and amplified by 100 fold and 5000 fold.

The invention claimed is:

1. A method for preparing basic zinc chloride, comprising:
preparing zinc chloride solution, ammonia water, and an induction system;
performing synthesis to obtain basic zinc chloride by feeding the zinc chloride solution and the ammonia water into the induction system in a parallel flow manner at a temperature of 60.0-90.0° C., continuing to react for 20.0-40.0 minutes after the feeding is completed; and
filtering and washing the basic zinc chloride, and then drying the basic zinc chloride for 4.0-8.0 hours at 80-105° C. to obtain a basic zinc chloride product,
wherein a zinc content of the zinc chloride solution is 50.0-150.0 g/L;
the ammonia water is prepared from an industrial grade ammonia water and contains 45.0-95.0 g/L of $NH_3$;
the induction system is hydrochloric acid solution containing an inducer, and the induction system has a pH of 0-5.0;
the inducer is a chlorinated or brominated quaternary ammonium salt;
the inducer is added to an amount of 0.005%-1.0% based on the total mass of a reaction system; and
a molar ratio of the zinc chloride solution to the ammonia water is 0.5:1- 0.65:1.

2. The method for preparing basic zinc chloride according to claim 1, wherein the zinc chloride solution is formed by dissolving and purifying industrial grade zinc chloride, or is obtained from an industrial grade zinc-containing waste material that undergoes leaching and impurity removal.

3. The method for preparing basic zinc chloride according to claim 1, wherein the pH of the induction system is 0-3.0.

4. The method for preparing basic zinc chloride according to claim 1, wherein inducer is added to an amount of 0.01%-0.5% based on the total mass of the reaction system.

5. A method for preparing basic zinc chloride, comprising:
preparing zinc chloride solution, ammonia water containing an inducer, and hydrochloric acid solution;
performing synthesis to obtain a basic zinc chloride by feeding the zinc chloride solution and the ammonia water containing an inducer into the hydrochloric acid solution in a parallel flow manner at a temperature of 60.0-90.0° C., continuing to react for 20.0-40.0 minutes after the feeding is completed; and
filtering and washing the basic zinc chloride, and then drying the basic zinc chloride for 4.0-8.0 hours at 80-105° C. to obtain a basic zinc chloride product,
wherein a zinc content of the zinc chloride solution is 50.0-150.0 g/L;
the ammonia water containing an inducer is obtained from dissolving the inducer in an ammonia water, the ammonia water is prepared from an industrial grade ammonia water and contains 45.0-95.0 g/L of $NH_3$;
the inducer is a chlorinated or brominated quaternary ammonium salt;
the inducer is added to an amount of 0.005%-1.0% based on the total mass of a reaction system; and
a molar ratio of the zinc chloride solution to the ammonia water is 0.5:1- 0.65:1.

6. The method for preparing basic zinc chloride according to claim 5, wherein the inducer is a quaternary ammonium salt that is at least one compound selected from the group consisting of tetrabutylammonium chloride, tetrabutylammonium bromide, cetyl trimethyl ammonium chloride, cetyl trimethyl ammonium bromide, octadecyl trimethyl ammonium chloride, and octadecyl trimethyl ammonium bromide.

7. The method for preparing basic zinc chloride according to claim 1, wherein the inducer is a quaternary ammonium salt that is at least one compound selected from the group consisting of tetrabutylammonium chloride, tetrabutylammonium bromide, cetyl trimethyl ammonium chloride, cetyl trimethyl ammonium bromide, octadecyl trimethyl ammonium chloride, and octadecyl trimethyl ammonium bromide.

\* \* \* \* \*